US012290831B2

(12) United States Patent
Scheu et al.

(10) Patent No.: US 12,290,831 B2
(45) Date of Patent: May 6, 2025

(54) GLUING STATION AND METHOD FOR OPERATING SUCH A GLUING STATION

(71) Applicant: Winkler + Dünnebier GmbH, Neuwied (DE)

(72) Inventors: Stephan Scheu, Neuwied (DE); Mathias Ruff, Oberbieber (DE)

(73) Assignee: Winkler + Dünnebier GmbH, Neuwied (DE)

( * ) Notice: Subject to any disclaimer, the term of this patent is extended or adjusted under 35 U.S.C. 154(b) by 595 days.

(21) Appl. No.: 17/616,661

(22) PCT Filed: Jun. 2, 2020

(86) PCT No.: PCT/EP2020/065203
§ 371 (c)(1),
(2) Date: Feb. 16, 2022

(87) PCT Pub. No.: WO2020/245110
PCT Pub. Date: Dec. 10, 2020

(65) Prior Publication Data

US 2022/0226858 A1 Jul. 21, 2022

(30) Foreign Application Priority Data

Jun. 4, 2019 (DE) ......................... 102019208131.2

(51) Int. Cl.
*B05C 1/08* (2006.01)
*B43M 5/04* (2006.01)

(52) U.S. Cl.
CPC .......... *B05C 1/0873* (2013.01); *B05C 1/0826* (2013.01); *B43M 5/04* (2013.01)

(58) Field of Classification Search
USPC .................................................. 118/259, 262
See application file for complete search history.

(56) References Cited

U.S. PATENT DOCUMENTS 3,259,062 A * 7/1966 Dahlgren .................. B41F 7/36
101/148
5,221,350 A 6/1993 Tallier et al.

FOREIGN PATENT DOCUMENTS

CN 102350871 A * 2/2012
CN 207608769 U * 7/2018
DE 74489 A 1/1893
(Continued)

OTHER PUBLICATIONS

English Translation CN-102350871-A (Year: 2012).*
English Translation CN-207608769-U (Year: 2018).*

*Primary Examiner* — Yewebdar T Tadesse
(74) *Attorney, Agent, or Firm* — Weitzman Law Offices, LLC

(57) ABSTRACT

A gluing station for applying glue to product elements guided in a product stream is intended to permit continuation of the production process and gluing of the product elements in a particularly simple and reliable manner even after a temporary machine stop or production standstill. For this purpose, according to the invention, a moistening system is assigned to a glue application roller that can roll on the product stream. During operation of the gluing station, in the event of a stopped product stream, the glue application roller is pivoted away from the product stream and the transfer roller for the duration of the standstill and is kept rotating, whereby the surface of the glue application roller is moistened.

7 Claims, 2 Drawing Sheets

(56) References Cited

FOREIGN PATENT DOCUMENTS

| | | | |
|---|---|---|---|
| DE | 3022040 | A1 | 3/1982 |
| DE | 19702364 | C1 | 4/1998 |
| DE | 112004000417 | T5 | 1/2006 |
| DE | 202013102761 | U1 | 7/2013 |
| DE | 102014117386 | A1 | 6/2016 |

* cited by examiner

GLUING STATION AND METHOD FOR OPERATING SUCH A GLUING STATION

FIELD OF INVENTION

The invention relates to a gluing station for applying glue to product elements guided in a product stream. It further relates to a method of operating such a gluing station.

BACKGROUND OF INVENTION

In the manufacture of flat paper products such as envelopes, mailing bags, and similar products, or also in the manufacture of single-ply or multi-ply fiber or tissue products such as hygiene products, handkerchiefs, toilet paper, or the like, the application of glue to the products may be necessary. In the case of the manufacture of envelopes, for example, the glue is applied to the envelope flap for subsequent adhesion thereto. In the process, the glue is remoistened by the moisture in a sponge or that in saliva and is thus activated.

The glue is usually applied to the products by passing the product elements past a gluing station in a product stream, for example an imbricated stream. Alternatively, the glue can also be applied to staggered or individual products at specific points or in block form. The gluing station typically includes a glue application roller to which the glue is applied from a glue bath or trough by means of an upstream scoop roller and an intermediate transfer roller. The glue application roller in turn rolls on the product/product stream, transferring the glue on its surface to the product elements.

In the ongoing production process, the glue application roller is thus continuously glued by the gluing unit, and it then immediately releases this glue again onto the product elements guided in the product stream, for example, especially the paper. In the event of a machine stop, however, where the product stream has to be interrupted briefly or temporarily, the glue application roller is swung away from the medium, and the gluing unit and the glue application roller are also separated. In such a case, the gluing unit is usually kept in motion by a continuous motor and continuously supplied with fresh glue, while the glue application roller, on the other hand, is not moved. When the machine stops, the glue on the application roller gradually dries. This means that when the production process is resumed and the glue application roller is started up, the product flow sticks to the application roller and thus causes a disruption in the production process.

SUMMARY OF INVENTION

The invention is therefore based on the task of specifying a gluing station of the type mentioned above, with which it is possible to continue the production process and the gluing of the product elements in a particularly simple and reliable manner even after a temporary machine stop or production standstill. Furthermore, a method for operating such a gluing station is to be specified.

With regard to the gluing station, this task is solved according to the invention by assigning a moistening system to the glue application roller.

The invention is based on the consideration that the difficulty of continuing the production process after a machine standstill, which is regarded as disadvantageous, is caused in particular by the drying out of the glue which begins during the standstill of the gluing station. Particularly in the case of the remoistenable types of glue preferred for the production of envelopes, this is made even worse by the fact that the glue in the comparatively moist state in which it is usually processed in the gluing station usually has a lower adhesive strength than when it becomes increasingly dry. The drying out of the glue thus not only results in fundamentally more difficult handling, but also additionally increases the risk of a detrimental effect on the subsequent process steps due to increasing gluing.

However, the cleaning of the glue application roller usually required after such a stoppage, during which the glue residues have to be completely removed manually, is time-consuming and resource-intensive. In order to remedy this situation, the gluing station should be equipped to keep the residual glue on the glue application roller moist as required, so that it can be processed further without any problems once the production process has been resumed. Accordingly, a moistening system is associated with the glue application roller in the sense that the (residual) glue on the surface of the application roller can be kept moist during a downtime of the system, i.e. that the surface of the application roller can be supplied with moisture to a degree that is at least sufficient for this purpose.

Advantageous embodiments of the invention are the subject of the subclaims.

The glue application roller is preferably designed as a rubber roller.

With regard to common water-based glues that are particularly suitable for the advantageously intended application, namely the application of remoistenable adhesive zones on envelopes, the moistening system is advantageously designed for glue moistening with water as the moistening agent. Particularly effective and efficient moistening can be achieved by supplying the water to the roller surface in the form of a water mist or a moist air stream. Particularly preferably, the moistening system therefore comprises a water nebulizer In a further preferred embodiment, the moist air flow is guided to the glue application roller close to the surface, i.e. preferably in such a way that the roller surface is acted upon particularly efficiently.

A particularly simple, cost-effective and reliable design of the system can be achieved in that the water nebulizer is advantageously designed as an ultrasonic atomizer, in particular with a fan, or comprises such a fan.

In another particularly advantageous embodiment, the guidance of the moist air is designed for particularly efficient, uniform and precise wetting of the surface of the glue application roller. For this purpose, the water nebulizer is advantageously combined with an outlet nozzle for the water mist or moist air stream, via which the water mist can be supplied to the surface of the glue application roller in a laminar flow, preferably uniformly at a suitable inflow angle. This ensures that the supplied water mist can largely adhere to the roller surface after flowing out of the outlet nozzle, so that particularly effective wetting with precipitation of the water mist on the roller surface is possible.

A particularly good transfer of the generated water mist to the roll surface can be achieved by the water nebulizer advantageously having a collection chamber for excess water mist in the mist outlet area. The excess moistening agent collected in this way can thus be returned directly to the roll surface, while in addition an intrinsically undesirable discharge of the moistening agent into other parts of the system can be minimized or possibly avoided altogether.

With regard to the method for operating a gluing station of the type mentioned, the above-mentioned task is solved in that, in the case of a product flow that is stopped, in particular temporarily, for the duration of the standstill, the glue application roller is pivoted away from the product flow and is kept rotating further, the surface of the glue application roller being moistened.

Alternatively or additionally, intermittent moistening of the glue application roller or intermittent or piecemeal rotation of the glue application roller can also be provided.

Preferably, and in an embodiment regarded as independently inventive, a water-based dextrin glue (remoistenable) is used in a gluing station of the type mentioned above. Such a glue in particular already has a comparatively strong adhesive effect when drying begins, which in particular can significantly exceed the adhesive effect in the moist state. Particularly in combination with such a glue, the intended glue moistening during the downtimes can particularly favor the subsequent, preferably almost undercutting-free continuation of the production process, since the glue remains limited in its adhesive effect due to the moistening and an undesirably strong sticking or adhering of the product parts after resumption of the process can be kept limited.

The advantages achieved with the invention consist in particular in the fact that the moistening system associated with the glue application roller makes it possible to achieve effective continuous moistening of the glue located on the surface of the glue application roller, so that its further processing is made possible in a particularly reliable and particularly simple and cost-saving manner, even after temporary downtimes in the production process.

BRIEF DESCRIPTION OF DRAWINGS

An embodiment of the invention is explained in more detail with reference to a drawing. Therein show.

Identical parts are marked with the same reference signs in both figures.

DETAILED DESCRIPTION

Figure 1:
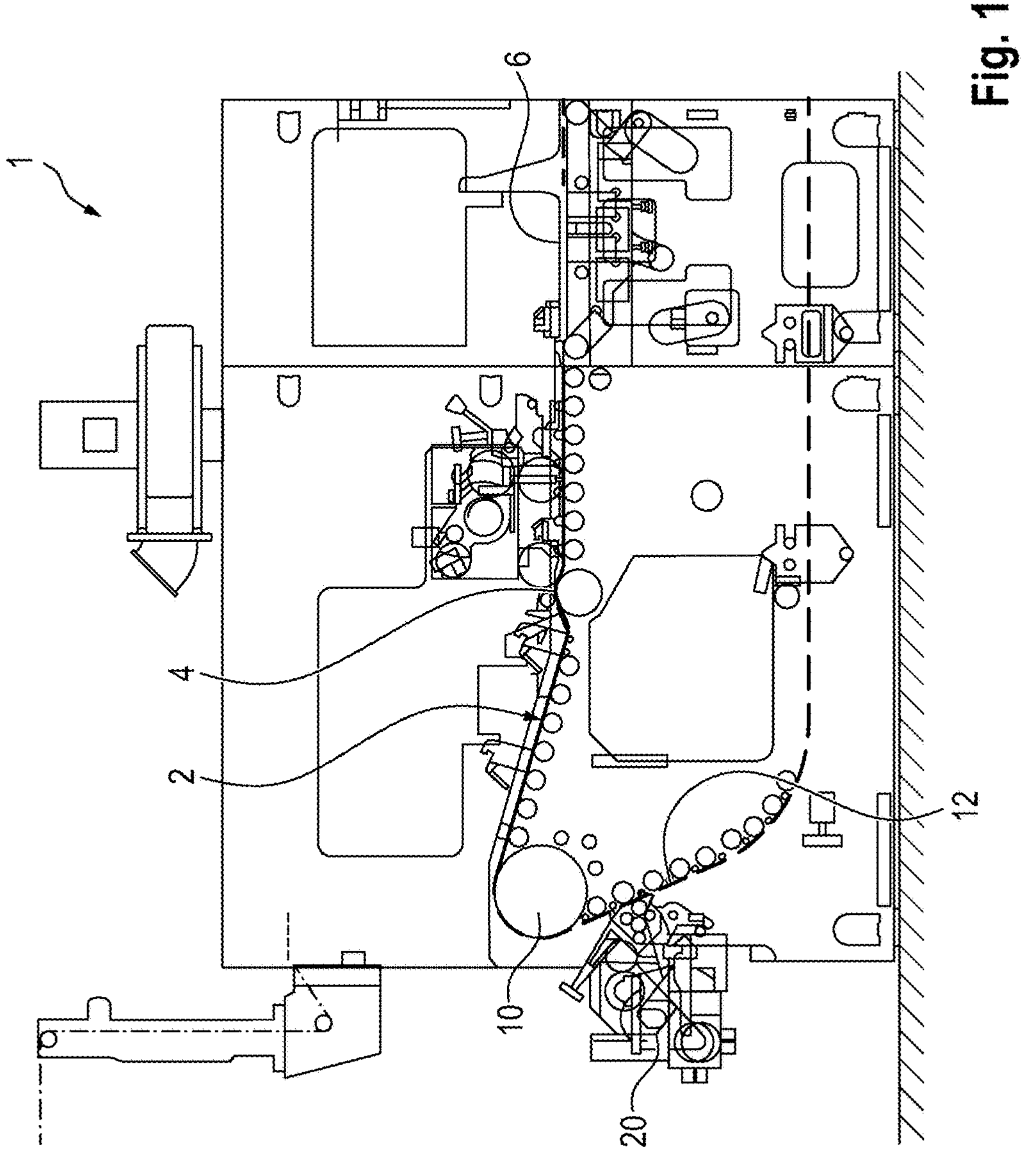
FIG. 1 production line for manufacturing envelopes.

The production line 1 shown in FIG. 1 is intended for the production of letter bags, envelopes 2 and/or mailing bags, each provided with a closure flap with adhesive zones. The production line 1 comprises several stations of conventional design, of which only parts of a bottom flap folding station 4 and a side flap folding station 6 are shown schematically in FIG. 1. From the side flap folding station 6, the envelopes 2 (and the like) enter a staggering station 8 with a staggering wheel 10. With the aid of the staggering wheel 10, the individually arriving products, envelopes 2 or mailing bags, are pushed together so that they overlap one another and are then transported further into a gluing or gluing station 20, forming a product stream 12, in the example a shingled stream. In the gluing station 20, a glue or adhesive 22 is applied to the insides of the flaps of the envelopes 2 or mailing pockets. Products are then pulled apart slightly so that the glue does not stick the products together. The adhesive 22 forming an adhesive zone is then dried in the drying section for further processing.

Figure 2:
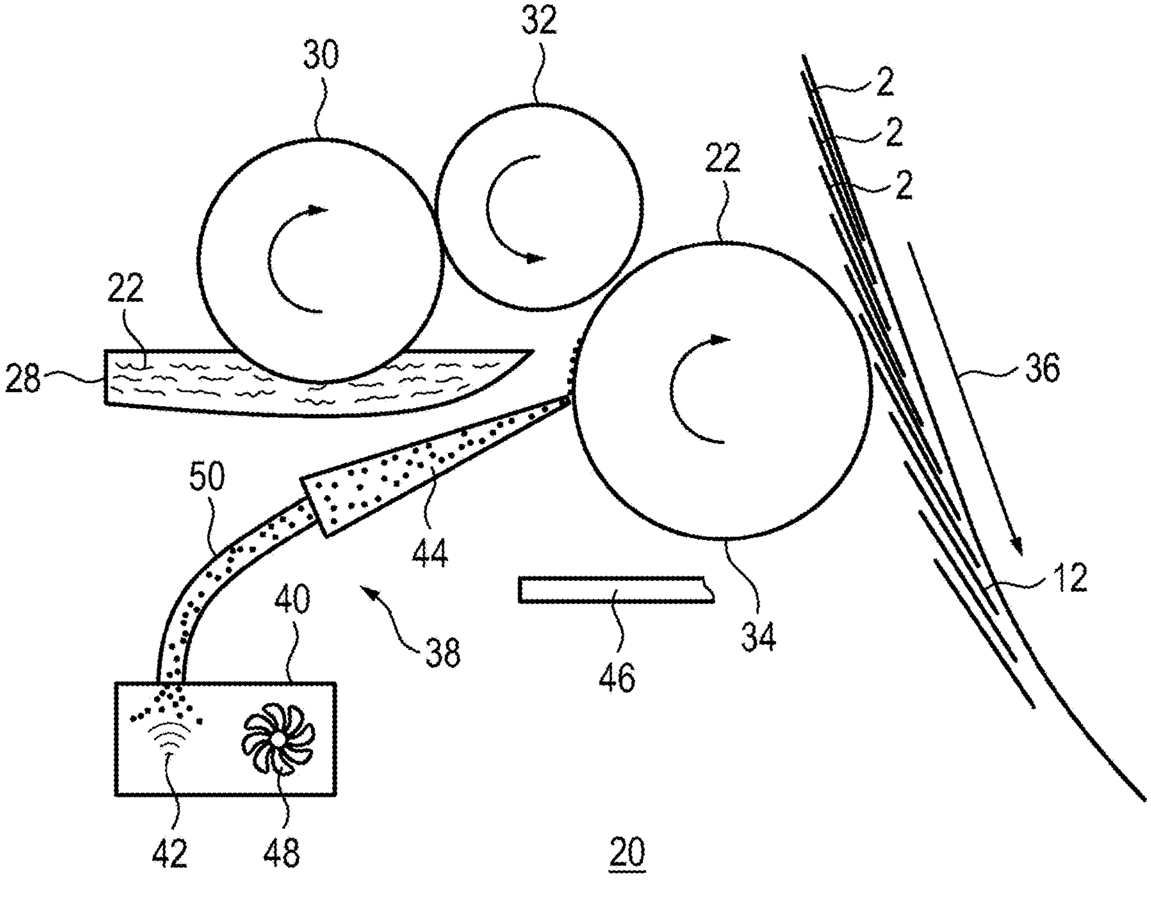
FIG. 2 gluing station of the production line shown in FIG. 1.

The gluing station 20 is shown enlarged in FIG. 2. It includes a glue trough 28 in which the glue or adhesive 22 is held ready for processing. A scoop roller 30 is partially immersed in the glue 22 held in the glue trough 28, so that when the scoop roller 30 rotates about its longitudinal axis, a partial amount of the glue 22 adheres to the surface and is thus conveyed out of the glue trough 28. Rolling on the surface of the scoop roller 30 is a transfer roller 32, to which the glue 22 adhering to the surface of the scoop roller 30 is transferred. A glue application roller 34 in the form of a rubber roller can be pivoted onto the transfer roller 32 and, when pivoted in, also rolls on the product stream 12 formed by the product elements, in this example the envelopes 2. The product stream 12 is thereby guided past the gluing station 20 in the transport direction indicated by the arrow 36, so that the glue 22 located on the surface of the glue application roller 34 is transferred to the desired positions of the product elements or envelopes 2.

In the event of a machine or production stop, in which the further transport of the product stream 12 in the transport direction is temporarily interrupted, for example as a result of a production error, a process malfunction or machine set-up work, the glue application roller 34 is temporarily swung out from the working position shown in FIG. 2 and separated from the transfer roller. In this case, the so-called gluing unit, i.e. the ensemble of scoop roller 30 and transfer roller 32, is kept in motion as required or unchanged by a continuation motor not shown in greater detail, and is continuously supplied with fresh glue 22, so that here drying of the glue 22 is prevented by the continuous material exchange.

The glue application station 20 is now specifically designed so that, in such a state of temporary production stop, the drying of the glue 22 located on the surface of the glue application roller 34 is also prevented in a particularly simple and reliable manner, so that, after termination of the temporary production stop, a particularly efficient and simple continuation or resumption of the production process can take place. For this purpose, during the production stop, an as-needed, preferably continuous, uniform moistening of the glue 22 located on the surface of the rotating glue application roller 34 is provided. To make this possible, the gluing station 20 is provided with a moistening system 38 associated with the glue application roller 34.

With regard to its components and their positioning within the gluing station 20, the moistening system 38 is thereby quite preferably designed for a demand-oriented supply of a moistening agent, in the embodiment example water, to the surface of the glue application roller 34. In the embodiment example, this supply is to take place as a water mist according to a particularly preferred embodiment of the invention, in order to ensure a resource-saving and yet very efficient use of the moistening agent. For this purpose, the humidification system 38 comprises a water nebulizer 40.

In this case, the water nebulizer 40 with its outlet nozzle 44 is suitable with regard to the intended mode of operation and is positioned close to the surface of the glue application roller 34, so that an efficient supply of the generated water mist to the glue application roller 34 is possible. In the particularly preferred embodiment shown, the water nebulizer 40 comprises an ultrasonic atomizer 42 as the actual nebulizing element.

In order to enable the preferred desired delivery of the generated water mist to the surface of the glue application roller 34 in laminar flow, the moistening system 38 is also provided with or combined with a suitably selected and dimensioned outlet nozzle 44 for the water mist. The water mist generated by the ultrasonic atomizer 42 is transported to the outlet nozzle 44 by a blower 48 and a suitably selected hose 50.

In addition, a collection chamber 46 for excess water mist is arranged in the mist outlet area downstream of the outlet nozzle 44. This serves to prevent any water mist that may bounce off the surface of the glue application roller 34 from escaping directly into the machine environment at the outlet of the nozzle 44, but to allow it to remain as far as possible on the glue application roller 34 or on the glue 22.

During operation of the production line 1 or of the gluing station 20, in the event of a stopped product flow 12, the glue application roller 34 is pivoted away from the product flow 12 and from the transfer roller 32 for the duration of the standstill and is further kept in rotation, the surface of the glue application roller 34 being moistened. When the production line 1 is restarted, the glue application roller 34 is preferably first glued for a few revolutions before it is pivoted towards the transport section. This is to ensure optimum glue consistency In the embodiment and in a particularly preferred embodiment, a water-based, remoistenable dextrin glue is used as the glue 22. When drying begins, this exhibits a significantly increased adhesive effect compared to the still liquid state. It can also be reactivated or removed from non-absorbent surfaces by adding water when drying begins. Its viscosity is preferably approx. 4450 mPA*s, its solids content approx. 67% and its density 1.16 g/ml.

LIST OF REFERENCE SIGNS

1 Production plant
2 Envelopes
4 Floor flap folding station
6 Side flap folding station
8 Relay station
10 Relay wheel
12 Product flow
20 Elimate station
22 Glue, adhesive
28 Glue tub
30 Scoop roller
32 Transfer roller
34 Glue application roller
36 Arrow
38 Humidification system
40 Water nebulizer
42 Ultrasonic atomizer
44 Outlet nozzle
46 Collecting chamber
48 Fan
50 Hose

The invention claimed is:

1. A gluing station for applying glue to product elements guided in a product stream, comprising:

a transfer roller to which glue held in a glue trough is transferred during operation of the gluing station, and a glue application roller which can be pivoted between a swung-in state and a swung away state, wherein, when the glue application roller is in the swung-in state, the glue application roller contacts the transfer roller to transfer glue onto a surface of the glue application roller and rolls on and applies glue to the product stream formed by the product elements, and wherein, when the glue application roller is in the swung away state in which the glue application roller is not in contact with the transfer roller or the product stream, a moistening agent is supplied to the surface of the glue application roller via an associated moistening system.

2. The gluing station of claim 1, wherein the glue application roller is designed as a rubber roller.

3. The gluing station of claim 1, wherein the moistening system comprises a water nebulizer.

4. The gluing station of claim 3, wherein the water nebulizer comprises an ultrasonic atomizer.

5. The gluing station of claim 3, wherein the water nebulizer comprises a collection chamber for excess water mist in a mist outlet area.

6. The gluing station of claim 1, wherein an outlet nozzle of the moistening system is positioned close to the surface of the glue application roller.

7. The gluing station of claim 1, wherein an outlet nozzle of the moistening system is configured such that water mist can be supplied to the surface of the glue application roller in laminar flow.

* * * * *